Patented Apr. 18, 1933

1,903,879

UNITED STATES PATENT OFFICE

ALFRED RHEINER, OF BASEL, SWITZERLAND, ASSIGNOR TO FIRM "CHEMICAL WORKS FORMERLY SANDOZ", OF BASEL, SWITZERLAND

MANUFACTURE OF EMULSIFYING AND WETTING-OUT AGENTS

No Drawing. Application filed July 8, 1930, Serial No. 466,593, and in Great Britain December 6, 1929.

In the textile, leather, dyeing and other industries it is usual to use wetting-out agents for the purpose of facilitating the treatment of the material.

I have found that mono-arylethers of glycerine and of glycol are very suitable for the preparation of wetting-out preparations and emulsifying agents. Such preparations are obtained if the mono-aryl-ethers of glycerine and of glycol, which are rather insoluble in water, are mixed with aliphatic, aromatic or hydro-aromatic carboxylic or sulphonic acids, their salts and substitution products, or other derivatives prepared from the substituted acids. The mixtures obtained in this manner give clear aqueous solutions or yield stable emulsions. Compounds which are suitable to be mixed with the mono-aryl-ethers of glycerine or of glycol are, for example, soaps, sulphonated oils, fats or fatty acids, fatty oils, naphthalene sulphonic acids, salicylic acid, benzyl-aniline sulphonic acid, alkylated, arylated or aralkylated naphthalene sulphonic acids and others. The preparations so obtained may be used as toilet or textile soaps, as adjuvants suitable for dye baths, printing pastes or bowking solutions, and for many other purposes.

Further, I have observed that the preparations obtained by mixing the mono-arylethers of glycerine or of glycol with the compounds enumerated above, possess excellent emulsifying properties which may be used for the production of stable emulsions of compounds difficultly soluble, or insoluble in water, such as aliphatic, aromatic or hydroaromatic hydrocarbons, halogenated hydrocarbons, alcohols or high molecular weight, phenols, fats, oils, terpenes and their hydrogenation products, essential oils, tar oils, tar, pitch, asphalt and others, which can be added in comparatively large proportions and give new preparations having a various and valuable action. The new preparations produced in this manner may be used as assistants in the textile and leather industries or as disinfecting preparations, as insecticides, as agents for splitting fats, or in the perfume industry or for cosmetic preparations and also for other different purposes.

An excellent wetting-out agent can be prepared by melting together 2 parts by weight of mono-cresyl-glycerine ether with 1 part of the potassium salt of the fatty acid of coconut fat; 1 per cent aqueous solution of this mixture wets out a raw cotton tissue so rapidly that it is immersed in about 5 seconds, while the same tissue is not impregnated by ordinary water even after several hours.

By treating equal parts by weight of oleine and of mono-cresyl-glycol ether with a sufficient quantity of an aqueous solution of potassium hydroxide required for saponification, preferably under heating and good stirring, a thick potash soap of similar wetting out properties as above described is obtained.

Instead of mono-cresyl-glycerine- or -glycol-ethers other mono-aryl-ethers may be used in mixture with the same or other soaps. According to the proportions employed, hard, gelatinous or liquid soaps may be prepared, which possess much better wetting and emulsifying properties than those of the ordinary soaps and which are more stable and quite odorless, compared to the known solvent-soaps, such as the methylcyclohexanol soap, for example.

Preparations of a specially good efficacy are obtained by mixing mono-aryl-glycerine- or glycol ethers with different soaps or with mixtures of soaps and sulphonated oils. For instance, by adding to cold water 2 per cent in volume of a preparation consisting of 1 part by weight of the potassium salt of the ricinoleic acid, 1 part by weight of Turkey red oil and 2 parts by weight of monocresyl-glycol ether, a solution is obtained which immediately impregnates a raw cotton tissue.

By mixing equal parts of mono-xylenyl-glycerine ether and of Turkey red oil, a preparation is obtained which yields with water, in any dilution, nearly clear solutions of an excellent wetting and emulsifying power.

According to the formula and quantity of the mono-aryl-glycerine- or -glycol ethers, preparations of different efficacy may be prepared. For instance the wetting-out property of ordinary sulphonated ricinoleic acid may be increased three fold by addition of 10 per cent of monoxylenyl-glycerine ether.

It is generally known that a similar increase in the wetting-power of Turkey red oil may be produced by the addition of hydrogenated phenols. Compared to such mixtures to preparations which contain Turkey red oil and mono-aryl-ether of glycerine possess the great advantage to conserve their action unaltered. For instance an aqueous solution containing 2 per cent (in volume) of a mixture of equal parts of methylcyclohexanol and Turkey red oil impregnates a raw cotton tissue nearly in the same time as an aqueous solution of 2 per cent of a mixture of equal parts of mono-xylenyl-glycerine ether and Turkey red oil. But the wetting-out power of the bath containing methylcyclohexanol is decreased, after it is left to stand for a day, to about one tenth of its original power, and it has almost disappeared after a week. Compared to this the solution containing the monoxylenyl-glycerine ether does not show any difference in its wetting-out power even after several weeks.

A preparation composed of 60 parts by weight of the sodium salt of the tetra-hydronaphthalene sulphonic acid and 40 parts by weight of mono-o-cresyl-glycerine ether possesses an excellent wetting-out action even in acid solution. Preparations of very strong efficacy may be prepared if, instead of the tetra-hydronaphthalene sulphonic acid, other aromatic or hydroaromatic acids, which possess themselves emulsifying and wetting-out properties are used.

For instance the following compounds are advantageously employed for this purpose: the alkali salts of the benzyl aniline sulphonic acid, of benzyl-p-amido-benzyl-aniline sulphonic acid, of benzylanthranilic acid or of naphthalene sulphonic acids, substitured in the nucleus by alkyl-, aryl- or aralkyl groups.

A detergent may be prepared by mixing 80 parts by weight of a sulphonated ricinoleic acid and 20 parts of mono-cresyl-glycerine ether with 100 parts of tetrahydronaphthalene. This solution remains almost clear on dilution with water and yields an emulsion of a good stability and the action of which is comparable with that of those which can be prepared with hydrogenated phenols. Instead of tetrahydronaphthalene other compounds difficultly soluble in water, e. g., aromatic hydrocarbons, halogenated hydrocarbons of the aliphatic or aromatic series, terpenes, essential oils and the like, are suitable for the production of stable emulsions, when proceeding as described.

What I claim is:—

1. A process for the manufacture of emulsifying and wetting-out agents, consisting in mixing monoarylethers of polyhydric alcohols with hydrotropic compounds of carboxylic or sulphonic acids of the aliphatic, aromatic and hydroaromatic series containing at least six carbon atoms in the molecule.

2. A process for the manufacture of emulsifying and wetting-out agents, consisting in mixing monoarylethers of low polyhydric alcohols with hydrotropic compounds of carboxylic or sulphonic acids of the aliphatic, aromatic and hydroaromatic series containing at least six carbon atoms in the molecule.

3. A process for the manufacture of emulsifying and wetting-out agents, consisting in mixing monoarylethers of glycerine with hydrotropic compounds of carboxylic or sulphonic acids of the aliphatic, aromatic and hydroaromatic series containing at least six carbon atoms in the molecule.

4. A process for the manufacture of emulsifying and wetting-out agents, consisting in mixing monocresylether of glycerine with hydrotropic compounds of carboxylic or sulphonic acids of the aliphatic, aromatic and hydroaromatic series containing at least six carbon atoms in the molecule.

5. A process for the manufacture of emulsifying and wetting-out agents, consisting in mixing monocresylether of glycerine with sulphonated castor oils.

6. A process for the manufacture of emulsifying and wetting-out agents, consisting in mixing monocresylether of glycerine with potassium oleate.

7. As new products the emulsifying and wetting-out agents, containing monoarylethers of polyhydric alcohols.

8. As a new article of manufacture the emulsifying and wetting-out agent, consisting of monoxylenylglycerine ether and sulphonated castor oil.

9. As a new article of manufacture the emulsifying and wetting-out agent, consisting of monocresylether of glycerine and of postassium oleate.

In witness whereof I have hereunto signed my name this 21st day of June 1930.

ALFRED RHEINER.